United States Patent Office 3,296,090
Patented Jan. 3, 1967

3,296,090
FERMENTATION PROCESS FOR PRODUCING
l-TRYPTOPHANE
Toshio Enatsu, Fushimiku, Kyoto, and Gyozo Terui, Higashiaumiyoskiku, Osaka, Japan (both % Commercial Solvents Corp., Terre Haute, Ind. 47808)
No Drawing. Filed May 28, 1964, Ser. No. 371,107
5 Claims. (Cl. 195—30)

This application is a continuation-in-part of prior application Serial No. 102,390, filed April 12, 1961, now abandoned.

Our invention relates to a process for the manufacture of l-tryptophane and more particularly it relates to a microbiological process for the economical production of l-tryptophane using anthranilic acid as a precursor.

l-Tryptophane is one of the essential amino acids necessary for nutrition. It has previously been produced using as precursors such materials as indole, indole pyruvic acid, etc. As a result, the economical manufacture of l-tryptophane by a microbiological process has not been considered practical.

We have now found that l-tryptophane can be produced economically and in excellent yields using our new process which is now available to provide this essential amino acid from a source heretofore considered impractical.

Our invention involves the cultivation of certain microorganisms of the Eumycetes group, having certain characteristics hereinafter more fully described, in an aqueous nutrient medium under conditions of aeration and agitation, the pH being maintained above 4 until l-tryptophane has accumulated in the medium.

Although the microorganisms which are useful in carrying out the process of our invention belong to the Eumycetes group, not all organisms of this group are suitable for use in our new process. The organisms which can be employed in our process include those which have a high tryptophane-autotrophic ability. It is well known that Eumycetes in general have tryptophane-autotrophic ability; i.e., the ability to convert an inorganic source of nitrogen or an organic nitrogen source of simpler structure to tryptophane which can then be utilized by the organism. However, organisms useful in our process should have a high tryptophane-autographic ability, enough to maintain the maximum specific growth rate of the organism in the absence or tryptophane and thus preserve the ability of the organism to synthesize l-tryptophane.

The presence or absence of high tryptophane-autotrophic ability of an organism can be determined by growth rate tests wherein a nutrient medium is continuously fed to the organism, which nutrient medium contains amino acids other than tryptophane, determining the growth rate as compared with a similar experiment wherein tryptophane is added along with other amino acids in the medium. If the organism grows as well when no tryptophane is added as it does when tryptophane is added, then maximum growth is being maintained and the organism has a high tryptophane-autotrophic ability.

A further characteristic of the organisms useful in the process of our invention is the inability to oxidize anthranilic acid to any large extent. The oxidizing ability of microorganisms is referred to as $QO_2$ which is defined as the amount of oxygen in milliliters consumed at a temperature of 30° C. in one hour in an aqueous nutrient medium by microorganism, the cells of which amount to one gram in dried form. In our invention we can employ microorganisms having a $QO_2$ of ten or under and we prefer to employ organisms having a $QO_2$ of five or under.

Organisms having the characteristics mentioned above and which are useful in the process of our invention include the l-tryptophane-producing strains of an organism selected from the group consisting of Candida, Debaryomyces, Hansenula, Pichia, Torulopsis, Rhizopus, Mucor, Circinella, Claviceps, Chaetomium, Fusarium, Saccharomyces uvarum, Saccharomyces shaosing, Saccharomyces marxianus, Saccharomyces willianus, Endomyces decipiens, Endomycopsis fibuliger, Cryptococcus laurentii, Zygosaccharomyces nukamiso and Pseudohansenula peipin.

We have found that the ability to produce tryptophane varies somewhat from species to species within the same genus. Similarly, there are differences in the ability to produce l-tryptophane within a specific species from strain to strain. For example, there are many strains which will produce approximately 100 milligrams of tryptophane per liter of culture medium in the species Hansenula anomala, however, some strains reach an accumulation of as high as 1–1.8 grams of l-tryptophane per liter of culture medium.

As indicated above, our new process for production of l-tryptophane is carried out under favorable conditions of aeration. Such aeration, and agitation as well can be effected by any known means. For production of l-tryptophane, it is also necessary to maintain the pH of the culture medium above 4. In many instances, the organism employed grows well at a pH less than 4 but in such instances, tryptophane is not produced, or the amount produced is reduced to a considerable extent.

We can employ any suitable culture medium in carrying out the process of our invention. A suitable source of carbohydrate, such as glucose, sucrose, beet molasses, etc., can be employed along with a source of inorganic nitrogen, such as ammonium nitrate, urea, etc. Other nutrients can be employed if desired such as yeast extract, phosphates, magnesium, sulfates, biotin, potash, trace minerals, calcium carbonate, etc.

The tryptophane produced according to our new invention can be recovered from the culture medium by any known means. Because of the production of other nutrients in the medium along with l-tryptophane, we have found that a very useful feed additive containing tryptophane can be obtained by separating the water insoluble solids from the culture medium and combining them with the water soluble materials obtained by evaporating the culture medium.

The l-tryptophane can advantageously be employed in a feed supplement. For instance, a feed supplement can comprise the dried water soluble and water-insoluble solids obtained from the cultivation of the above mentioned l-tryptophane-producing strains of microorganisms to produce l-tryptophane in accordance with the process of this invention.

The following examples are offered to illustrate our invention but we do not intend to be limited to the specific procedures, materials or conditions indicated. Rather we intend to include all equivalents obvious to those skilled in the art.

*Example I*

A 1-liter portion of an aqueous nutrient medium containing 200 grams of beet molasses containing 56 percent sugar, 0.5 gram of potassium phosphate, 4 grams of ammonium nitrate, 0.5 gram of urea and 1 gram of anthranilic acid was inoculated with a strain of Hansenula anomala. The pH of the medium was maintained at 6.

To the medium was then added 2 percent sterile calcium carbonate and the solution maintained at 30° C. with agitation and aeration for five days The yield of tryptophane was 1 gram.

*Example II*

A medium made up of 6 percent glucose, 0.4 percent ammonium nitrate, 0.3 percent urea, 0.1 percent potassium phosphate, 0.05 percent magnesium sulfate, 0.1 percent yeast extract, 2 micrograms per liter of biotin, and 0.05 percent anthranilic acid was inoculated with *Candida utilis* and the medium cultured under conditions of agitation and aeration at 30° C. for five days. Tryptophane in the amount of 250 milligrams per liter was produced.

*Example III* l-Tryptophane was produced as in Example II except that the organism *Saccharomyces willianus* was employed. Tryptophane in substantial quantities was produced.

*Example IV* l-Tryptophane was produced by the same process as described in Example II except that the organism *Fusarium roseum* was employed. Tryptophane was produced in substantial quantities.

*Examples V to XXXI*

Two aqueous mediums designated S and C were made up having the following compositions:

TABLE I

|  | S (g./l.) | C (g./l.) |
|---|---|---|
| Glucose | 70 | 60 |
| Sucrose | 30 | |
| KH₂PO₄ | 1.0 | 1.0 |
| MgSO₄·7H₂O | 0.5 | 0.5 |
| NH₄NO₃ | 6.0 | 4.0 |
| Urea | 1.0 | 3.0 |
| Yeast extract | 1.0 | 1.0 |
| Anthranilic acid | 1.4 | 0.5 |
| CaCO₃* | 20 | 20 |

*Added after sterilization.

A 1-liter portion of each of the media was inoculated with a microorganism identified in the Table II below and the medium cultured under conditions of agitation and aeration of 26° C. or 27° C. for 5 or 6 days. The results as well as the medium and specific conditions employed are also shown in the table.

TABLE II

| Example | Micro-organism | Medium | Cultivation Temp., °C. | Culture period in days | Tryptophane produced (mg./l.) |
|---|---|---|---|---|---|
| V | Endomyces decipiens | C | 27 | 5 | 100 |
| VI | Endomycopsis fibuliger | C | 27 | 5 | 100 |
| VII | Saccharomyces uvarum | C | 27 | 5 | 200 |
| VIII | Saccharomyces shaosing | C | 27 | 5 | 200 |
| IX | Saccharomyces marxianus | C | 27 | 5 | 200 |
| X | Pichia sake | S | 26 | 6 | 500 |
| XI | Pichia farinosa | S | 26 | 6 | 300 |
| XII | Pichia farinosa | S | 26 | 6 | 400 |
| XIII | Hansenula anomala | S | 26 | 6 | 400 |
| XIV | Hansenula saturnus | S | 26 | 6 | 400 |
| XV | Hansenula markii | S | 26 | 6 | 800 |
| XVI | Hansenula suaveolens | S | 26 | 6 | 500 |
| XVII | Hansenula anomala var. ciferrii | S | 26 | 6 | 1200 |
| XVIII | Debaryomyces hansenii | C | 27 | 5 | 150 |
| XIX | Cryptococcus laurentii | C | 27 | 5 | 100 |
| XX | Toulopsis xylinus | C | 27 | 5 | 150 |
| XXI | Toulopsis uvae var | C | 27 | 5 | 150 |
| XXII | Candida utilis | C | 27 | 5 | 300 |
| XXIII | Mucor genevensis | C | 27 | 5 | 50 |
| XXIV | Mucor javanicus | C | 27 | 5 | 50 |
| XXV | Rhizopus nigricans | C | 27 | 5 | 50 |
| XXVI | Circinella chinensis | C | 27 | 5 | 50 |
| XXVII | Chaetomium globasus | C | 27 | 5 | 0 |
| XXVIII | Claviceps purpurca | C | 27 | 5 | 50 |
| XXIX | Fusarium roseum | C | 27 | 5 | 150 |
| XXX | Zygosaccharomyces nukamiso | C | 27 | 5 | 200 |
| XXXI | Pseudohansenula peipin | C | 27 | 5 | 200 |

It is claimed:

1. A process for the production of l-tryptophane which comprises cultivation of l-tryptophane producing strains of an organism selected from the group consisting of Candida, Debaryomyces, Hansenula, Pichia, Torulopsis, Rhizopus, Mucor, Circinella, Claviceps, Chaetomium, Fusarium, *Saccharomyces uvarum, Saccharomyces shaosing, Saccharomyces marxianus, Saccharomyces willianus, Endomyces decipiens, Endomycopsis fibuliger, Crytococcus laurentii, Zygosaccharomyces nukamiso* and *Pseudohansenula peipin*, said organism having a $QO_2$ of not more than 10 and high tryptophane-autotrophic ability in an aerated aqueous nutrient medium containing anthranilic acid and maintained at a pH of not less than 4 until a substantial amount of l-tryptophane is produced and accumulated in the medium.

2. The process of claim 1 wherein the organism is a strain of *Hansenula anomala*.

3. The process of claim 1 wherein the organism is a strain of *Candida utilis*.

4. The process of claim 1 wherein the organism is a strain of *Saccharomyces willianus*.

5. The process of claim 1 wherein the organism is a strain of *Fusarium roseum*.

References Cited by the Examiner

UNITED STATES PATENTS 2,999,051  9/1961  Malin _____ 195—29

FOREIGN PATENTS 849,279  9/1960  Great Britain.

OTHER REFERENCES

Nelson et al., Applied Microbiology, vol. 8, No. 3, pages 179 to 182, May 1960.

A. LOUIS MONACELL, *Primary Examiner.*

ALVIN E. TANENHOLTZ, *Examiner.*